United States Patent Office 2,876,106
Patented Mar. 3, 1959

2,876,106
SOLID DIETETIC FOOD COMPOSITION

Pranas Jucaitis and Irene D. Bliudzius, Chicago, Ill., and Norman P. Rockwell, Wilmington, Del., assignors, by direct and mesne assignments, to E. I. du Pont de Nemours and Company, Wilmington, Del., a corporation of Delaware No Drawing. Application March 25, 1957
Serial No. 647,961

6 Claims. (Cl. 99—141)

This invention is directed to low calorie and diabetic food compositions which contain a Polyose as a bulking agent.

Sugar not only sweetens but also supplies bulk and forms an integral part of the physical structure of a number of common solid foodstuffs. In order to prepare dietetic versions of such foods intended for those who must restrict their intake of carbohydrates or calories, or both, it is necessary to prepare such foods using no sugar or very little sugar.

Heretofore, it has been impossible to produce low calorie and dietetic foodstuffs which closely resemble normal calorie-containing foods in taste and physical appearance by using bulking agents other than sugar. The difficulty has been twofold: either the substitute bulking agent was nutritive and added back most, if not all, of the calories contained in the sugar removed, or such bulking agent altered food texture and eating quality so that the product was not appetizing or wholesome.

This invention relates to dietetic solid food compositions containing a non-nutritive bulking agent having a volume consistency and appearance comparable to food compositions containing usual carbohydrate or carbohydrate-containing bulking agents. These non-nutritive bulking agents are used in a manner similar to other bulking agents. One may add to the low nutritive food product a non-caloric sweetener to obtain a sweetness level which one is accustomed to obtain with sugar when it is added in the same fashion. This makes low calorie food compositions which are easily and pleasantly usable as conventional carbohydrate-containing foodstuffs.

Solid foods that contain substantial amounts of sugar which can be replaced by an equivalent amount of Polyose include various baked products such as breads and crackers, sweet pastries, cakes, cookies, cake icings, and the like. Also included are solid and semi-solid candies of all types, and chewing gum. These products are more particularly described as follows:

By the term baked products is included those baked foodstuffs prepared using any flour such as whole grain of graham flour, wheat germ, corn meal, rye, soya, cotton seed, peanut, rice flour, potato flour, oatmeal and bean flour.

By cakes and cookies, reference is had not only to a sweetened product of flour and other ingredients in the form of loaf or mass, but also to a small mass of dough, sometimes unleavened, which may be used as a vehicle for hash, meat, fish, mashed potatoes, etc.

By pastries is included articles of food made of or containing a dough or paste, as, for example, doughnuts.

By icing, reference is had to a coating for foodstuffs, for example, cakes, made from sugar combined with milk, water, or egg white.

By candy, reference is had not only to sugar crystals or a hard crystalline mass formed by evaporating or boiling cane sugar, a syrup, or the like, but also to a confection covered with these crystals or broken from this mass. Included also are food products made from sugar, varied by the addition of fruits, nuts, chocolate, etc.

By chewing gum, reference is had to a preparation of chicle or like substance, sweetened and flavored, which is chewed as a masticatory.

A Polyose can be used as a bulking agent for diabetic food compositions in place of sugar because it provides the functions, except sweetness, of sugar in these products yet does not have the high calorie and carbohydrate content of sugar. It supplies weight and bulk and serves to build suitable structure in the above-indicated solid foods.

A Polyose is a glucose polymer derived from starch by depolymerization followed by heat polymerization described in detail in the Durand Patent 2,563,014. The Polyoses are sold by the Corn Products Refining Company. The Polyoses have a considerably different susceptibility to amylolytic enzymes than the original starch or its conventional degradation products. The products on test contain groups which act very much like small amounts of reducing sugar, not in excess of about 5 to 7% in Polyose A. The reducing sugar is not construed as due to the presence of free glucose.

A preferred Polyose for purposes of the invention is Polyose C which can be described as a glucose polymer derived from starch by depolymerization followed by heat polymerization to such an extent that at 50 percent solids it gives a viscosity (Brookfield) of 20–100 poises at 70° F. More viscous or less viscous Polyoses can be used. Polyose A required 67 percent, Polyose B, 60 percent, and Polyose D requires only 40 percent of solids to give a viscosity equivalent to that of Polyose C.

Thus, foodstuffs can be prepared which have normal nutritive value as regards their protein, fat and mineral content but which have a sub-normal carbohydrate and calorie content. Such foodstuffs are suitable for persons who must eat dietetic foods or who must follow carbohydrate or caloric restricted diets, such as persons suffering from diabetes, obesity, or maybe just too much healthy appetite. The dietetic foodstuffs of this invention have a taste, volume, physical appearance and consistency comparable to that of conventional carbohydrate-containing foodstuffs.

The quantity of Polyose used as a bulking agent in a food composition like those described herein can be determined by reference to the texture or consistency as shown, for example, by volume and density of such food composition when prepared with usual sugar, sugar-containing, or in certain instances, starch or other carbohydrate-containing bulking agents. The normal quantity of bulking agent may be replaced in whole or in part by appropriate amounts of a Polyose. The result is that dietetic foodstuffs are prepared which contain a concentration of Polyose varying over a wide range—from about 3 to 85 percent by weight of total product weight. The preferred and more narrow range is 5 to 60 weight percent. The exact amount of Polyose used in any given instance will vary with the particular product being made.

A non-caloric sweetener composition which can be added to the product to keep it at a normal sweetness level includes a non-caloric sweetener such as cyclamate and saccharin. The cyclamate can be any of the salts of N-cyclohexyl sulfamic acid or the acid itself as described in Audrieth Patent 2,275,125. Of the salts, it is preferred to use an alkali metal salt such as calcium, sodium, potassium, magnesium, ammonium cyclamate and the like.

Mixtures of the non-caloric sweetening agents can also be used. Thus, there can be used mixtures of cyclamate with saccharin or with saccharin and sorbitol as described in the Gordon Patents 2,629,665 and 2,653,105. However, as sorbitol is nutritive, too much should not be used.

When sodium cyclamate, calcium cyclamate, or other soluble cyclamate is used as a sweetening agent, the amount used will range from about .005 to 5 percent by weight of product. More narrowly, the amount used ranges from about 0.05 to 2.5 percent by weight of product.

Mixtures of cyclamate and saccharin can be substituted for the cyclamate only provided one bears in mind the fact that saccharin is about ten times sweeter than cyclamate. If a mixture of cyclamate and saccharin is used, the range of amounts of non-nutritive sweetening agents used can be defined as follows:

(1) Weight percent of cyclamate+10×weight percent of saccharin=.005 to 5 weight percent of product More narrowly:

(2) Weight percent of cyclamate+10×weight percent of saccharin=0.5 to 2.5 weight percent of product Either cyclamate or saccharin can be used to the exclusion of the other. Formulas 1 and 2 (above) remain correct when the weight percent of either cyclamate or saccharin is equal to zero. One preferred mixture of sweetening agent contains an alkali cyclamate such as sodium or magnesium cyclamate and saccharin in a cyclamate:saccharin weight ratio of 10:1.

Still other proportions of the low calorie sweeteners can be used as set out in the Gordon patents previously mentioned. In each instance, the quantities to be used in a particular food composition can be determined readily by reference to the sweetness level of such food compositions when prepared with usual thickening agents. The dietetic food composition may be made more or less sweet than the non-dietetic food composition as desired.

The relationship between the amount of Polyose used and the amount of cyclamate and saccharin mixture used in the product can be defined as follows:

(3)
$$\frac{\text{Weight percent of polyose}}{\text{Weight percent of cyclamate}+10\times \text{weight percent of saccharin}}=4 \text{ to } 1000$$

More narrowly:

(4)
$$\frac{\text{Weight percent of polyose}}{\text{Weight percent of cyclamate}+10\times \text{weight percent of saccharin}}=10 \text{ to } 600$$

Certain other substances can also be used in conjunction with Polyose to improve texture and eating qualities of the food compositions of this invention. These include various gums such as gum arabic, carragheen, guar gum, gum tragacanths, gum ghatti. Also usable are hydrolyzed collagen and degraded gelatin. Similarly, there can be used tapioca, carboxy methylcellulose, methyl cellulose or soy bean protein. Some of the last named have nutritive value and too much should not be used.

Various fibrous agricultural by-products such as dried grapefruit sacs or ground rice hulls, hexanols and other additives can be added to improve texture and eating qualities. Similarly, humectants, softeners, emulsifiers, and stabilizers can be added to obtain effects well known and understood in the art.

Compositions of the invention can include additives such as those shown in the Gordon patents and in Brenner 2,691,591.

The compositions of my invention can be sold as dry mixtures to be prepared by the buyer into the final food product for consumption. Perishable constituents of the food composition are then excluded (such as whole eggs, milk and certain shortenings). The weight ranges of Polyose used in such dry compositions can then be determined by reference to the weight of the finished food product.

Representative examples of foodstuffs using a Polyose as a bulking agent follow. While these examples each use proportions suitable for the particular food composition shown and described, the determination of other suitable proportions for the other food compositions included in this invention can be made readily. Standard manufacturing procedures are applicable to all formulations.

EXAMPLE 1

Cake

| Ingredient | Unit | Amount |
|---|---|---|
| Flour | cups | 2½ |
| Shortening | do | 1½ |
| Whole eggs | | 4 |
| Skim milk | cups | 1 |
| Polyose A | do | 1½ |
| Calcium cyclamate | oz | 1/16 |
| Baking powder | tsp | 3½ |

Sift together flour and baking powder. Mix Polyose A and calcium cyclamate and cream this mixture with the shortening. Add the eggs to the shortening mixture, and then carefully mix all the ingredients.

Bake in oven at 350° F. for 20 to 30 minutes.

EXAMPLE 2

Vanilla wafer

| Ingredient | Unit | Amount |
|---|---|---|
| Butter | lb | ¼ |
| Polyose C (finely divided) | cups | 1 |
| Vanilla | tsp | 1 |
| Flour | cups | 1¾ |
| Milk | do | ½ |
| Calcium cyclamate | grams | 2 |
| Saccharin | do | ½ |

Cream the butter. Sift, then beat in the Polyose until smooth. Add vanilla. Sift and resift flour with cyclamate and saccharin and add same to creamed mixture alternatively with the milk. Beat mix until creamy.

Lightly cover a baking sheet with shortening and chill some. Then, with a spatula, spread about 2 tablespoonfuls of the mixture over sheet as thin and evenly as possible. Sprinkle with chopped nuts. It is well to press them down a bit so that they will stick. Take a sharp knife and mark off the batter into 1½ inch squares.

Bake in 325° oven until brown. When done, take from oven and, while hot, quickly cut through the marked squares and remove from sheet.

EXAMPLE 3

Corn meal bran bread

| Ingredient | Unit | Amount |
|---|---|---|
| Butter | cups | ½ |
| Polyose D | do | ½ |
| Whole eggs | | 2 |
| Bran | tbsp | 2 |
| All purpose flour | cups | ⅔ |
| Baking powder | tsp | 1⅓ |
| Table salt | do | ½ |
| Corn meal | tbsp | 5½ |
| Milk | cups | 1 |
| Saccharin | grams | 1 |
| Sodium cyclamate | do | 1 |

Cream the butter. Add gradually and mix with the Polyose until light and creamy. Then beat in one egg at a time. Stir in the bran. Sift flour; mix baking powder, salt, corn meal, saccharin and cyclamate then beat in the sifted ingredients in about three parts alternately with thirds of the milk. Add raisins and nuts.

Spread the batter in a greased 9 x 12 inch bread pan. Bake the bread in a moderate oven at 375° for about 20 minutes.

EXAMPLE 4

Gum drops or Turkish paste

| | | |
|---|---|---|
| Gelatin | tbsp | 2 |
| Cold water | cups | ½ |
| Hot water | do | ¾ |
| Polyose B | do | 2 |
| Table salt | tsp | ⅛ |
| Grated lemon rind | tsp | 1 |
| Lemon juice | tsp | 1 |
| Vanilla | tsp | 1 |
| Saccharin | grams | 1/10 |
| Calcium cyclamate | do | 1 |

Soak the gelatin in the cold water. Pour the hot water over the Polyose and salt and stir until Polyose and salt are dissolved. Add the soaked gelatin. Bring the ingredients to boiling point and boil them slowly until the mixture has a uniform texture or until ten minutes have elapsed, which ever is shorter.

Remove the syrup mixture from the heat source and add the lemond rind, lemon juice, vanilla, saccharin and cyclamate. It is well to taste the candy to see that it is flavored sufficiently.

Pour the mix into a pan that has been dipped into cold water and permit the syrup to harden for 12 hours. Cut it into squares or oblongs with a hot knife and roll the pieces in a sweetener composition disclosed in corresponding application Serial No. 598,733, filed July 19, 1956.

EXAMPLE 5

Vanilla marshmallow candy

| | | |
|---|---|---|
| Gelatin | lb | .02 |
| Polyose B | lb | .32 |
| Sorbitol | lb | .2 |
| Corn syrup | lb | .1 |
| Calcium cyclamate | oz | .005 |

Carefully blend all ingredients until a mixture of uniform texture is achieved. Spread in suitable pan and chill.

EXAMPLE 6

Cake icing

| | |
|---|---|
| Polyose A | 2 cups. |
| Water | 1 cup. |
| Egg whites | From 2 eggs. |
| Salt | ⅛ tsp. |
| Lemon juice | 5 drops. |
| Vanilla | 1 tsp. |
| Calcium cyclamate | .0001 lb. |
| Saccharin | .00001 lb. |

Dissolve the Polyose in the water until the syrup forms a soft ball when dropped into cold water. (It may be necessary to boil the water and Polyose mixture.) The egg whites should be at room temperature. Add the salt to the egg whites and whip them until they are stiff or fluffy. The syrup is poured upon them while they are very hot in a fine stream, the eggs being beaten constantly during the addition of the syrup and afterward until the icing becomes creamy and of the right consistency to spread. Just before the whipping is completed add the lemon juice, cyclamate and saccharin, together with the vanilla.

EXAMPLE 7

Meringue

| | | |
|---|---|---|
| Egg whites | lb | .4 |
| Polyose C | lb | .6 |
| Water | lb | .6 |
| Agar-agar | lb | .012 |
| Calcium cyclamate | lb | .025 |
| Baking powder | tsp | 2 |
| Vanilla | tsp | 1 |

Blend the Polyose C, water, agar-agar, baking powder, and calcium cyclamate until they are light and creamy, then beat in slowly the egg whites. When all the ingredients have been mixed together, beat for several minutes and blend in the vanilla.

Spread the meringue lightly over the pie, cake, or other food on which it is to be used and bake. Usual baking time is for 40 minutes at 350° F.

EXAMPLE 8

Chewing gum

| | Pound |
|---|---|
| Pontianac gum | .187 |
| Gutta katian | .176 |
| Gutta soh | .033 |
| Candelilla wax | .005 |
| Polyose D | .300 |
| Sorbitol | .100 |
| Cherry flavor | .020 |
| Calcium cyclamate | .005 |

The ingredients are first blended together thoroughly. Then the mixed gums and wax are heated until the total batch contains 8 to 9 percent moisture and formed into sticks.

What is claimed is:

1. A dietetic solid food composition containing between 3 and 85 composition weight percent of a glucose polymer bulking agent derived from starch by depolymerization followed by heat polymerization to such an extent that between 40 and 67 percent solids give a viscosity of 20–100 poises at 70° F., the composition also containing between .005 and 5 composition weight percent of a mixture of sweeteners selected from the group consisting of saccharin and cyclamate, such that:

Weight percent of cyclamate + 10 × weight percent of saccharin = .005 to 5 weight percent of product 2. A dietetic solid food composition containing between 3 and 85 composition weight percent of a glucose polymer bulking agent derived from starch by depolymerization followed by heat polymerization to such an extent that between 40 and 67 percent solids give a viscosity of 20 to 100 poises at 70° F., the composition also containing a mixture of sweeteners selected from the group consisting of saccharin and cyclamate such that:

Weight percent of cyclamate + 10 × weight percent of saccharin = .05 to 2.5 weight percent of composition 3. The dietetic solid food composition of claim 2 wherein the composition contains a grain flour.

4. A dietetic solid food composition according to claim 2 which is a chewing gum.

5. A dietetic solid food composition according to claim 2 which is a candy.

6. A solid dietetic food composition comprising at least 3 weight percent of a glucose polymer derived from starch by depolymerization followed by heat polymerization to such an extent that between 40 and 67% solids give a viscosity of 20 to 100 poises at 70° F. as a bulking agent and at least 0.005 weight percent of a mixture of sweeteners selected from the group consisting of saccharin and cyclamates.

References Cited in the file of this patent

UNITED STATES PATENTS

| | | |
|---|---|---|
| 1,495,789 | Hamor et al. | May 27, 1924 |
| 1,801,053 | Meigs | Apr. 14, 1931 |
| 2,302,511 | Wallach | Nov. 17, 1942 |
| 2,563,014 | Durand | Aug. 7, 1951 |
| 2,629,665 | Gordon | Feb. 24, 1953 |